Jan. 8, 1924.  
A. W. GAST  
1,479,801  
PROCESS FOR MAKING GLASS PLATE LETTERS  
Filed July 15, 1922  
4 Sheets-Sheet 1
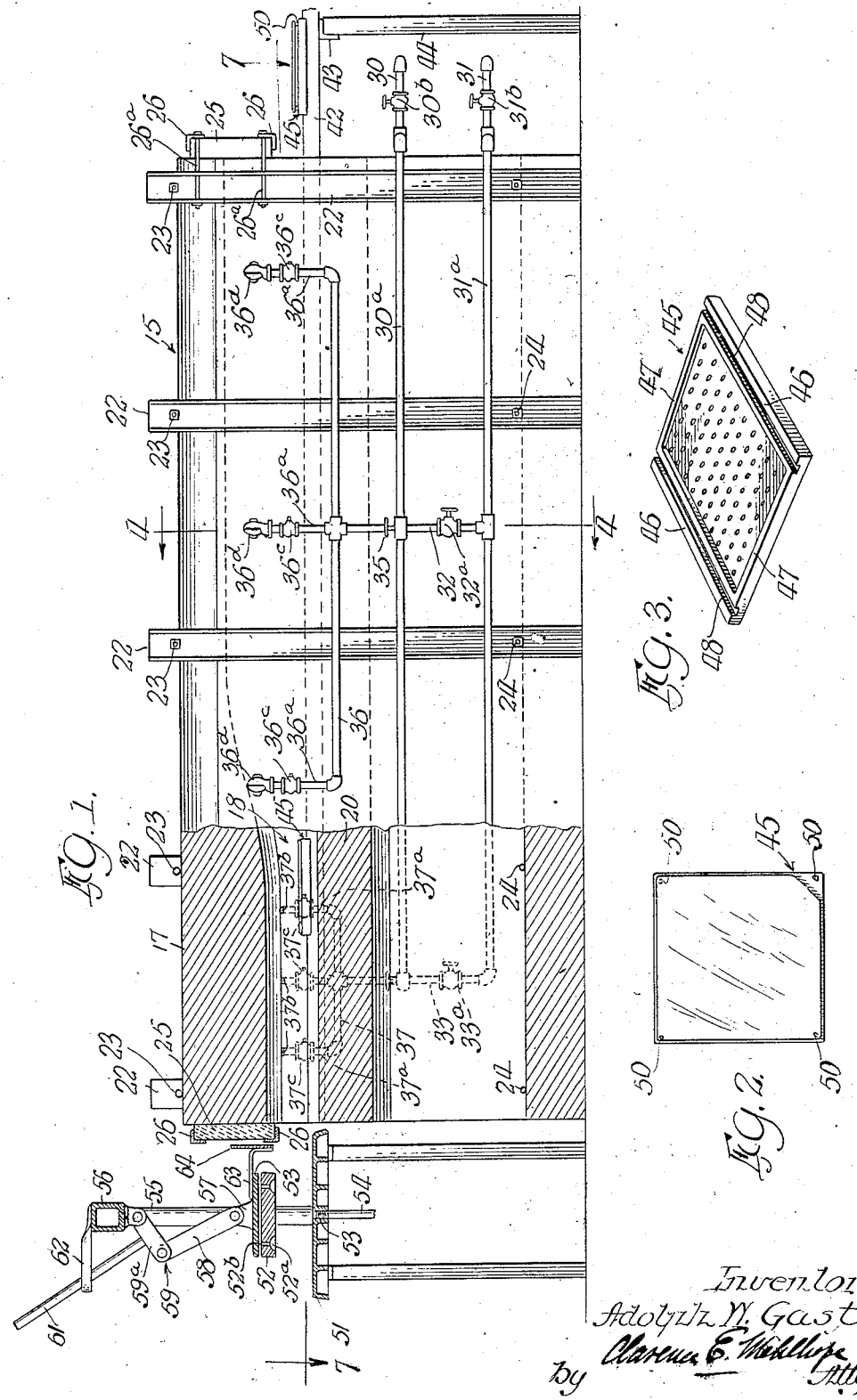

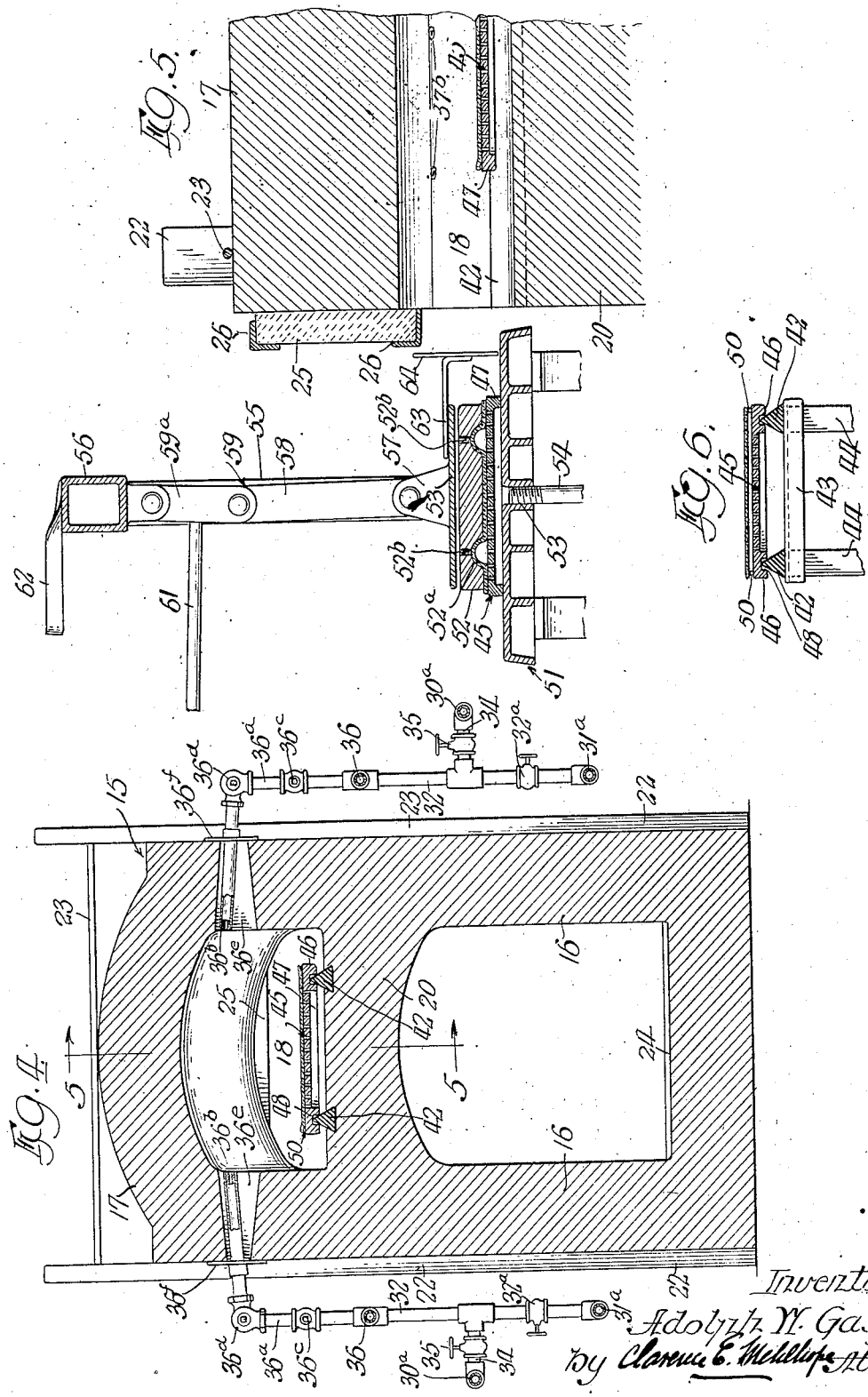

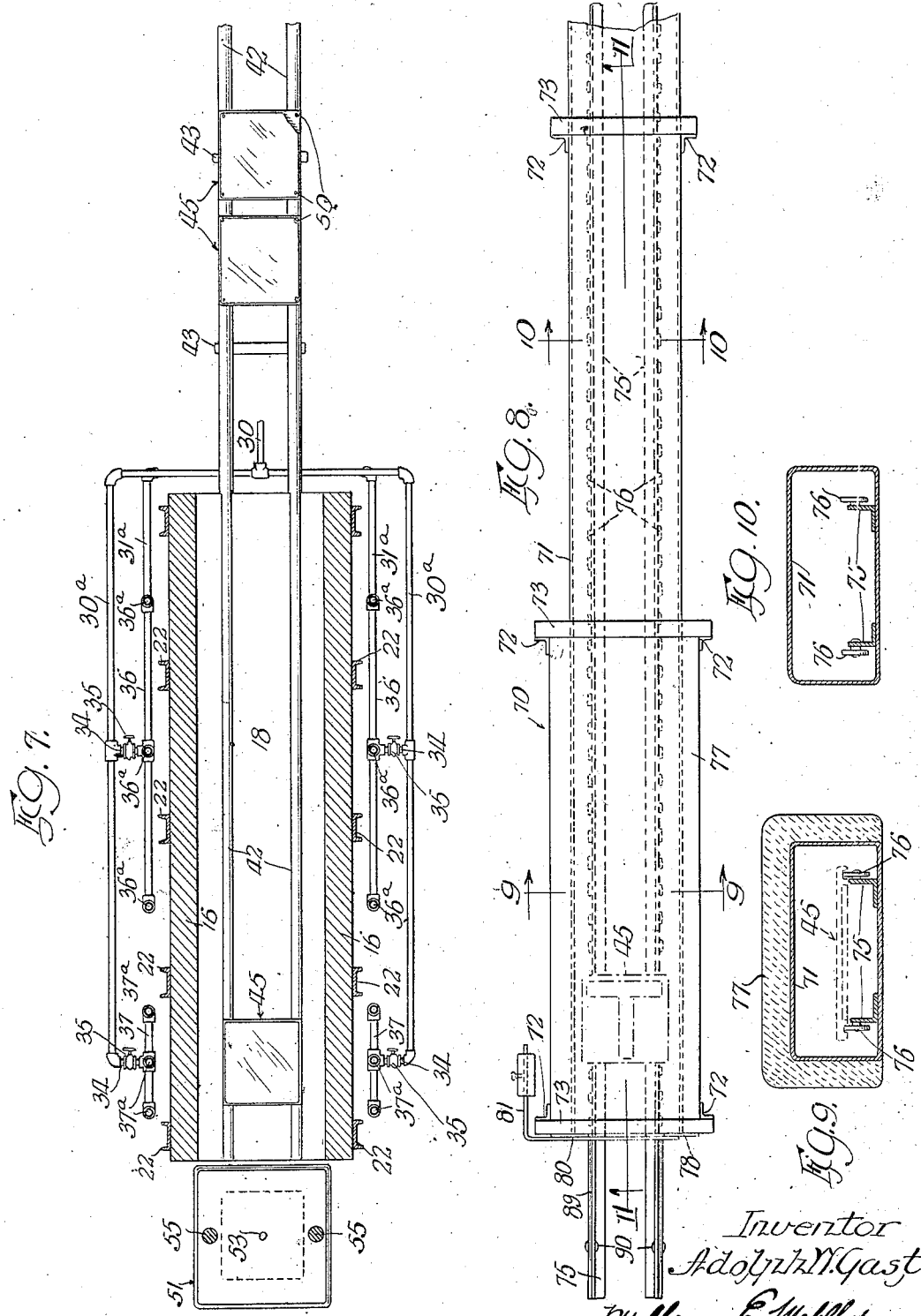

Jan. 8, 1924.
A. W. GAST
1,479,801
PROCESS FOR MAKING GLASS PLATE LETTERS
Filed July 15, 1922    4 Sheets-Sheet 4
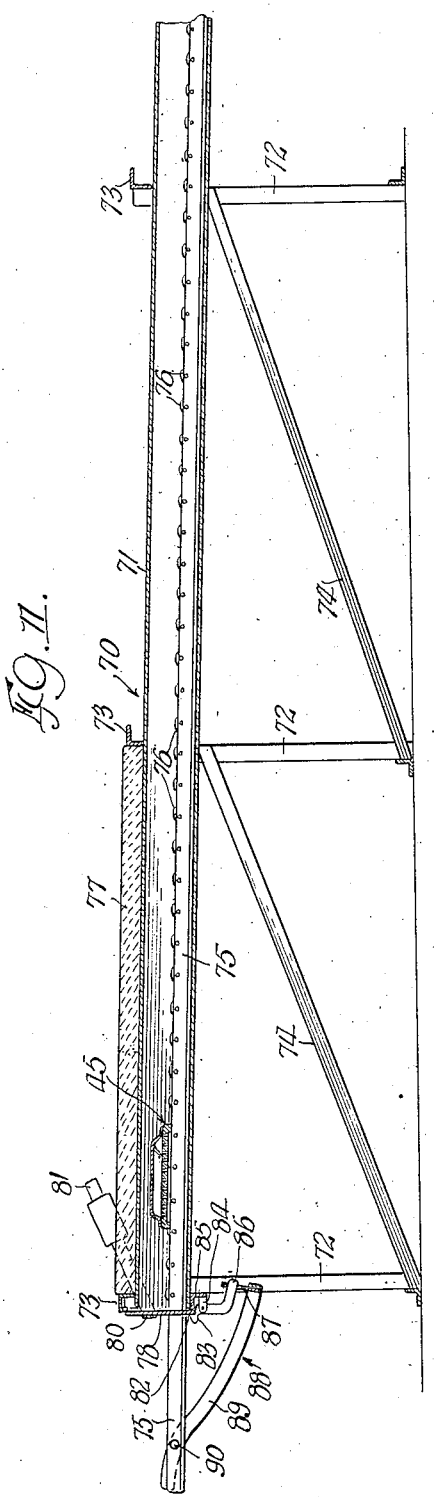
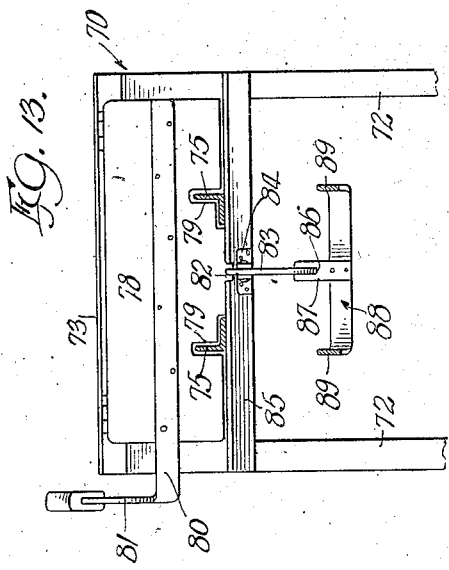
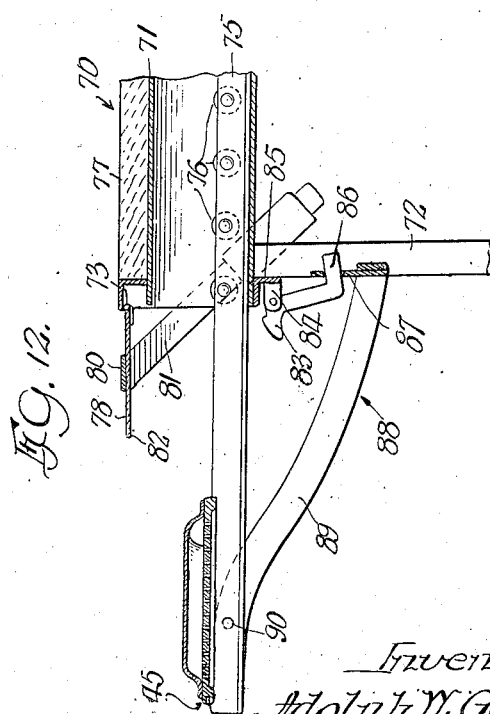

Patented Jan. 8, 1924.

1,479,801

UNITED STATES PATENT OFFICE.

ADOLPH W. GAST, OF CHICAGO, ILLINOIS, ASSIGNOR TO CHICAGO MINIATURE LAMP WORKS, OF CHICAGO, ILLINOIS, A CORPORATION OF ILLINOIS.

PROCESS FOR MAKING GLASS PLATE LETTERS.

Application filed July 15, 1922. Serial No. 575,145.

*To all whom it may concern:*

Be it known that I, ADOLPH W. GAST, a citizen of the United States, and a resident of Chicago, county of Cook, and State of Illinois, have invented certain new Improvements in a Process for Making Glass Plate Letters; and I do hereby declare that the following is a full, clear, and exact description thereof, reference being had to the accompanying drawings, and to the letters of reference marked thereon, which form a part of this specification.

The invention relates to improvements in a process for making glass-letter-plates and in an apparatus for carrying out said process and consists of the matters hereinafter described and more particularly pointed out in the appended claims.

The letter plate to be made consists of a glass-plate of substantially uniform thickness throughout, with a letter, design, character or other device appearing in relief on one side, namely, the face side of the plate, and with a corresponding depression on the reverse side of plate. Such type of letter plate is well known in the art.

The invention relates to improvements in a process and apparatus of the kind heretofore disclosed in Letters-Patent 1,308,408 granted to me on July 1st, 1919. The object of the invention is to further improve and perfect the process and apparatus described in said patent, whereby the efficiency of the same is greatly increased and the loss of glass-plate blanks due to the cracking or breaking of the plates, is reduced to a minimum.

In carrying out the process as herein described, a glass blank of suitable dimensions to contain the desired letter, design, character or other device within its outline—and preferably with a marginal space about the letter or design—is placed face-up on a perforated, supporting plate of substantially the same plan area as that of the glass blank to be treated. But instead of being placed directly in contact in the first instance with the top face of said metal supporting plate, the glass blank is brought to rest on the metal supporting plate or carrier through the medium of interposed, thin supports, preferably placed at the four corners of the glass-blank-plate. The said supports leave a slight space between the top of the metal plate and the adjacent bottom surface of the glass blank. The space provided is about that which is equal to the thickness of the glass-blank-plate itself and fragments of glass blanks may be conveniently used as the interposed supporting devices between the metal plate and the glass blank.

The glass blanks on their supporting plates or carriers are then heated in a suitable furnace, as described in the aforesaid patent, the heat then being applied in such manner as to evenly and equally heat the glass blanks throughout and being continued until the glass of the blanks becomes pliable and capable of being affected by pressure against a die.

In carrying on a process of the kind, the metal supporting plates or carriers, although they may be absolutely flat and smooth on top when first used, soon become slightly warped and, for this and possibly for other reasons, their top surfaces do not conform to the intended flat planes in which they were made. When a glass blank is placed directly upon the metal supporting plate, as heretofore, there is not a continuous contact at all points between the glass blank and the metal supporting plate or carrier, but only contact at the several higher points or parts of the supporting plate or carrier. The parts of the carrier plate in contact with the glass-blank-plate are apt to heat the glass-blank-plate at said contact points more rapidly than at other points where the two plates are not in contact, with the result that there is a tendency for the glass-blank to fracture or break in the carrying out of the process;—and in fact a considerable percentage of the glass-blank-plates do break, resulting in loss of economy in the process.

In carrying on the process described herein, with the glass-blank-plate in the first instance raised slightly above the surface of the metal supporting plate, the glass-blank-plate will be held away from the metal plate at all points until it becomes soft enough to collapse under its own weight, where-upon it will come into contact, except at the aforesaid points of support, with the entire surface of the metal supporting plate, notwithstanding said metal surface has become, or is, uneven.

A number of perforated supporting plates are provided as before so that the process may be carried on as a continuous process. The glass blanks, supported face up on their respective perforated plates, with the interposed thin spacing and supporting devices between the two plates, are slowly advanced through a long furnace, being introduced at one end of the furnace at which a low temperature is maintained and being then advanced slowly through successive zones of increasing temperature, until finally they are ready to be removed, one at a time, from the hottest end of the furnace, to be then subjected to the letter-forming part of the process. The rate of advance of the blanks through the furnace must be such that when the blank on its supporting plate reaches the discharge or outlet end of the furnace, the blank will have been raised to a temperature at which it may be treated under pressure on a die.

The blanks are in succession treated under a high pneumatic pressure against a hot die, which bears in intaglio on its bottom face, the letter, design, character or other device to be formed on the glass blank. The die should be kept at a high temperature, such that there will be no chilling of the glass blank when it is brought face up into contact with said die.

After the glass blank has been subjected to the action of the die, the blank is dislodged or loosened from the metal plate and then, while still on the supporting plate, is cooled. This cooling step of the process is brought about by passing the glass plate upon its metal supporting plate through a cooling and annealing oven. Said oven is constructed with walls capable of varying degrees of radiation. The temperature in the hotter end of the annealing oven is produced and maintained by the heat of the letter plates and their metal supporting plates as they are successively introduced into the oven. Suitable thermometers are provided to indicate the temperature at various points in the oven. If the temperature in the hotter part of the oven falls below the point at which it should be maintained, the heat may be conveniently increased by inserting and passing through the oven with the others, a hot metal plate containing no letter plate.

The plates are passed through a zone in the annealing oven where the oven walls retain most or all of the heat in the letter plates and their supporting plates, and then through a zone where the oven walls radiate heat more rapidly and the heat in the letter plates is given up,—so that there results a slow cooling and annealing of the glass letter plates.

In order to illustrate the new process, I attach drawings hereto which show a novel and improved apparatus for carrying out the process.

In the drawings:

Fig. 1 is a view, partly in side elevation and partly in longitudinal section illustrating the novel apparatus for forming raised letters on glass plates.

Figs. 2 and 3 show detail views of the metal supporting plate which will later be described more fully.

Fig. 4 is a transverse vertical section on an enlarged scale through Fig. 1 in a plane indicated by the line 4—4 of Fig. 1.

Fig. 5 is a partial section through Fig. 4 in a plane indicated by the line 5—5 of Fig. 4.

Fig. 6 is a detail cross sectional view showing the construction and arrangement of the rails which support the letter blank supporting plates in their travel through the heating oven, or furnace.

Fig. 7 is a horizontal section through Fig. 1 in a plane indicated by the line 7—7 of Fig. 1.

Fig. 8 is a top plane view of the annealing oven.

Figs. 9 and 10 are transverse sectional view in planes indicated respectively by the lines 9—9 and 10—10 of Fig. 8.

Fig. 11 is a longitudinal sectional view through Fig. 8 in a plane indicated by the line 11—11 of Fig. 8.

Fig. 12 is a detail longitudinal sectional view on a slightly enlarged scale at the front end of the annealing oven.

Fig. 13 is a front elevation of the parts shown in Fig. 12.

Referring now in detail to the apparatus illustrated in the drawings:—15 indicates an elongated furnace body which forms a part of the improved apparatus. This furnace is preferably made of brick and has upright side walls 16, an arched top wall 17 and a longitudinally extending heating chamber 18, having a bottom wall 20.

The furnace body is suitably braced by means of upright channel bars 22, placed at regular intervals along its sides, and these upright bars are connected together by top and bottom transverse stay-bolts 23, 24. 25, 25 indicate fire proof slabs or aprons which partially close the ends of the chamber 18 at the top and prevent the too rapid escape of heat therefrom. These slabs 25 are suitably held in place by angle bars 26 which are attached by bolts 26ª to the endmost upright channel bars 22 before mentioned.

The chamber 18 is heated in the following manner: 30 indicates a fuel gas supply pipe (see Fig. 11) which has branch pipes 30ᵃ, 30ᵃ arranged on each side of the furnace body and extending substantially throughout its length. (See Fig. 7.) A shut-off valve 30ᵇ is provided in the pipe 30. 31 indicates an air pressure supply pipe having branch pipes 31ᵃ, 31ᵃ arranged on each side of the furnace body in a plane below the branch pipes 30ᵃ of the fuel gas supply pipe 30. A shut-off valve 31ᵇ is provided in the pipe 31. 32, 33 indicate upright pipes arranged in pairs on each side of the furnace body leading from the air pressure branch pipes 31ᵃ and having shut-off valves 32ᵃ 33ᵃ. Short, horizontal pipes 34 (see Fig. 4) connect the fuel gas branch pipe 30ᵃ with the upright pipes 32, 33 and in these pipes 34, shut-off valves 35 are provided.

Each upright pipe 32, 33 has longitudinally extending header pipes 36, 37 from which lead burner pipes 36ᵃ, 37ᵃ which extend through the upright side walls of the furnace near the top and terminate in nozzles 36ᵇ, 37ᵇ. In each burner pipe 36ᵃ, 37ᵃ are valves 36ᶜ, 37ᶜ which may be adjusted to control the amount of gas and air under pressure to be supplied to the burner pipes. The nozzle sections 36ᵇ, 37ᵇ are connected to the burner pipes 36ᵃ, 37ᵃ by means of swing joint fittings 36ᵈ. In the side walls of the furnace body are provided openings 36ᵉ so formed that the nozzle pipes may be swung vertically upon the joint fitting 36ᵈ to control the direction of the flame issuing from the nozzle pipes into the heating chamber 18. Fixed on the nozzle pipes 36ᵇ, 37ᵇ are sealing plates 36ᶠ which close the outer ends of the opening 36ᵉ.

It will be noted that the burner pipes 36ᵃ at the right hand end of the furnace, which is the loading end of the furnace, are more widely separated than are the burner pipes 37ᵃ at the opposite end of the furnace. With this arrangement of the burner pipes and of the various valve devices before mentioned, together with the vertical adjustment of the nozzle pipes,—the temperature within the chamber 21 may be graduated from the desired low temperature at the loading end of the furnace to the predetermined high temperature at the other or discharge end of the furnace. The vertical height of the furnace chamber 18 is made less at the discharge end than that at the loading end. Less fuel is thus required to heat the discharge end of the furnace chamber to the desired high temperature.

Within the furnace 18, and extending slightly beyond the loading end thereof, are located spaced rails 42 which are preferably triangular in cross section. The bottom parts of said rails are embedded in the bottom furnace wall 20 so that one corner part of each rail projects above the plane of the top of said bottom wall, as shown in Fig. 4, and provides a track. At the loading end and beyond the furnace, said rails are supported on cross bars 43 fixed to upright metal posts 44.

45 (see Figs. 2 and 3) indicates one of a plurality of the supporting plates or carriers upon which the glass blanks are placed, to be gradually fed through the furnace chamber 18 from the loading end of the furnace to the discharge end. Each plate carrier 45 is somewhat wider than the distance between the rails 42. On the bottom side of said plate are provided depending side flanges 46 and depending end flanges 47, and in the side flanges 46 are provided longitudinally extending grooves 48 adapted to engage upon the tracks provided by the exposed top corners of the triangular rails 42. The part of the plate within the side and end flanges 46 and 47 is perforated. When introducing a glass blank into the furnace, one of said glass blanks, which is substantially of the same plan area as the carrier 45, is placed upon one of said carrier plates which has been mounted upon the rails 42 beyond the loading end of the furnace. Before said glass blank is placed upon the carrier, a small fragment of glass 50, of the thickness of the glass blank itself, is placed at each corner of a carrier as shown in Fig. 2. The glass blank thus rests at its corners upon said fragments and its bottom surface is spaced slightly above the top surface of the carrier. Before the glass fragments have been placed upon the carrier, a coating of whiting is preferably applied to the top surface of the carrier to prevent the glass blank from sticking to the carrier when heated. In positioning the glass blank upon the carrier, care is taken to see that the edges of the glass blank are spaced equally from the edges of the carrier plate, as shown in Fig. 2.

The carrier with the associated glass blank is then placed upon the rails 42. Carrier plates, each bearing glass blanks, are then advanced into the furnace chamber 18 and pushed therethrough by any suitable means. This may be done by means of a long bar. Each carrier and glass blank is allowed to remain at the loading end of the furnace until it is heated to a desired temperature before it is further advanced into the furnace chamber. Several of the carriers and glass blanks may be made ready so that after the first carrier and plate have been advanced into the furnace, a continuous procession of carriers and glass blanks may follow.

As the carrier and its glass blank is advanced through the furnace they are gradually heated. When under the action of heat, the glass blank becomes soft enough to collapse under its own weight, it will fall into engagement with the top surface of the carrier and conform to said surface without fracturing or breaking, no matter how uneven or irregular said top surface may be. The glass fragments at the corners, gradually become adhered to the bottom of the glass blank.

When a carrier and its associated glass blank reaches the discharge end of the furnace, an operator takes a hooked bar and engages the carrier and withdraws it and its associated glass blank, now properly heated, and delivers them upon a horizontal table 51 which is arranged with its top surface in the plane of the bottom edges of the flanges of the carrier 45. With this arrangement no jar or jolt is imparted to the carrier to fracture the glass blank thereon in any manner.

The carrier with the glass blank thereon is centered on the table 51 with respect to a die plate 52. In the center of the part of the table 51 covered by the carrier 45, when the same is upon the table, an opening 53 is provided and connected to this opening is a pipe 54 which leads from a suitable air pressure tank (not shown). Rising from the side margin of the table at its middle are upright standards 55 (see Figs. 1 and 2) which are connected at their top ends by a cross head 56. Slidably mounted on these standards is the die plate 52 before referred to. This die plate has a depression 52$^a$ in its bottom surface which outlines a letter or other device to be produced in the glass blank. Small openings 52$^b$ which open through the top of the die plate are provided in the depression 52$^a$. This die plate 52 is removably secured in any suitable manner to a head plate 53, the connection being such that the die plate is capable of a limited floating movement with respect to the head plate, so that said die plate can accommodate itself to any irregularity in engagement with the carrier plate upon the table 51. Upon the top surface of the head plate, which include lateral parts to engage the upright standards 55, are spaced ears 57 between which is pivoted the bottom member 58 of a toggle jointed bar 59, the top member 59$^a$ of which is pivoted between ears 60 depending from the cross head 56 connecting the top ends of the standards together. The said bar member 59$^a$ has an operating lever 61 secured to it and this lever normally engages a hook 62 on the cross head 56 to hold the die plate in a position above the table 51, (as shown in Fig. 1). To the top surface of the head plate 53 are secured L shaped brackets 63 which support a baffle plate 64, arranged near the adjacent discharge end of the furnace.

After a carrier 45 and its associated glass blank have been withdrawn from the furnace and centered in position upon the table 51, the operator releases the lever 61 from the hook 62 and depresses said lever to bring the die plate 52 into engagement with the glass blank on the carrier, and also to bring the carrier into a position where its flanges 46 and 47 are held in close engagement with the top surface of the table, so as to provide a substantially air tight seal between said carrier flanges and said table.

With the parts in this position, air is admitted through conduit 54 and the air pressure thus reduced between the table top and the flange area of the carrier 45 will force the glass blank to conform to the depression 52$^a$ in the die plate 52. The letter, character or other device is thereby produced in the glass blank. The operator momentarily releases the pressure on the lever 61 so that the air may assist in raising the glass blank from the carrier to break the bond or adhesion between the glass blank and the carrier.

When the die plate has been brought into its letter forming position, the baffle plate 64 substantially closes the end of the furnace chamber 18 so that the escaping air in the bond-breaking-operation cannot blow into the end of the furnace chamber 18 and cool said end of the furnace. The air through the conduit 54 is momentarily shut off and the die plate raised to, and held in this elevated position by means of the lever 61, and the hook 62. Should the glass blank adhere to the die plate, the adhesion is broken by inserting a thin peel or blade between the engaging surfaces of the die plate and glass blank.

During the formation or blowing of the raised letter in the glass blank, the edges of the die plate so engage the edge of the glass blank that any drawing in of the edges of the glass blank is prevented and thus the edges of said glass blank are maintained in straight lines. The die plate 52 is maintained at a temperature so as not to fracture the glass blank by chilling it, when first brought into contact with it.

After the raised letter has been thus formed and the die plate 52 has been elevated to its normal position, a thin blade is inserted between the glass blank and carrier to test the adhesiveness between said glass plate and carrier. Should the glass plate stick to the carrier it is loosened by means of said thin blade or peel. After this operation has been completed the operator, using a suitable tool in the form of a thin flat shovel, removes the carrier plate with the glass letter plate thereon and places it in an annealing oven which will now be described.

70 indicates the annealing oven (see Figs. 8 to 13). Said annealing oven consists primarily of an elongated rectangular tubular casing 71 which is inclined downwardly from its inlet end to its discharge end. Said casing 71 is secured at its sides to the top ends of upright standards 72 which are connected and braced by means of transversely extending angle bars 73 and by longitudinally extending bars 74 (see Fig. 11). Resting upon the bottom wall of the chamber within the casing 71 and projecting beyond the inlet end thereof are longitudinally extending angle bar rails 75, the horizontal flanges of said rails being fixed to the bottom wall of the casing in any suitable manner. The upright flanges of said rails are provided with anti-friction rollers 76 which are spaced apart a distance equal to the spacing of the rails 42 in the furnace, so that when a carrier plate 45 is inserted in the annealing oven, the grooves 48 in the bottom surface of said plates will engage upon said rollers. The sides and top of the inlet end of said annealing oven is covered and enclosed by a jacket or covering of heat absorbing and retaining material 77, (as shown in Figs. 8, 9, and 10).

At the inlet end of said oven is provided a door 78 which is hinged to a cross bar 73. Said door is cut away as at 79, (see Fig. 13) to fit the angle bar rails 75. Fixed to the front surface of said door is a bar 80 which is bent at a right angle to provide a weight arm 81. On the bottom edge of the door at its middle is provided a lip 82 which is adapted to be engaged by a pawl 83 pivoted to swing in the longitudinal median plane of the oven, as shown (see Fig. 12). Said pawl is pivoted between ears 84 fixed to a cross bar 85 connecting the front standards 72 of the oven. Said pawl has a bent extension 86 which engages in a recessed plate 87 on the rear end of a yoke 88. The yoke includes side arms 89 which are pivotally connected at their ends to the ends of the rails 75, by means of rivets or bolts 90.

The parts are so arranged that when the door 78 is in its normal vertical position wherein it closes the inlet end of the oven, the lip 82 is engaged behind the pawl 83 and the forward ends of the arms 89 extend into a plane slightly above that of the top edges of the rails 75. When the operator has removed the carrier plate 45 with the glass-letter-plate thereon from the forming table, he places said carrier plate upon the front ends of the rails 75. In so doing the weight of the carrier plate will engage the front ends of the yoke arms 89 and depress the same, thus swinging the rear end of said yoke and its recessed plate 87 upwardly. The plate 87 by reason of its engagement with the extension 86 of the pawl 83 will swing said pawl so as to release it from engagement with the lip 82 of the door. When the door is thus released its weight arm 81 will act to swing the door into a horizontal open position, as shown in Fig. 12. The carrier plate together with the glass-letter-plate thereon is now pushed into the oven and the door 78 is closed, the lip 82 engaging behind the pawl 83 and locking the door in closed position. The next glass-letter-plate is treated in the same way. By reason of the inclination of the rail 75 and with the anti-friction rollers 76 thereon no great effort is needed for the operator to push the first plate further into the annealing oven to permit the introduction of the next succeeding carrier plate and letter plate.

Suitable temperature indicating means (not shown) are provided in connection with the insulated end of the annealing oven so that the predetermined temperature which is best suited for the proper annealing of the glass-letter-plate may be maintained. Upon observation should this temperature drop below said predetermined point it may be increased again by inserting a metal carrier plate which has been passed through the furnace for the purpose of heating the same. As the letter plates and carriers are slowly moved in succession from the annealing oven they will slowly give up their heat and thus gradually cool.

I claim as my invention:—

1. The process of making glass-letter-plates which consists in heating a glass blank together with a supporting plate, with the glass blank supported upon but spaced above the surface of the supporting plate by small fragments placed at intervals between the blank and plate, the heat being applied until the glass blank becomes pliable and workable under pressure against a die, and in then subjecting the glass blank to pressure against a die to form the letter, character, or other device in the letter plate.

2. The process of making glass-letter-plates which consists in heating a glass blank together with a perforated supporting plate with the glass letter blank supported upon but spaced above the surface of the supporting plate by small fragments placed at intervals between the blank and the plate, the heat being applied until the glass blank becomes pliable and workable under pressure against a die, and in then subjecting the glass blank to pneumatic pressure against a die to form the letter, character or other device in the letter plate.

3. The process of making glass-letter-plates, which consists in heating a glass blank together with a supporting plate, with small fragments interposed at spaced intervals between the blank and plate to space the glass blank from the supporting plate, the heat being applied until the glass blank becomes pliable and workable under pressure against a die, the fragments being of material adapted to adhere in the heating process to the bottom surface of the glass blank, and in then subjecting the glass blank to pressure against a die to form the glass letter plate.

4. The process of making glass-letter-plates which consists in heating a glass blank together with a perforated supporting plate, with small fragments interposed at spaced intervals between the blank and the plate to space the glass blank from the supporting plate, the heat being applied until the glass blank becomes pliable and workable under pressure against the die, the fragments being of material adapted to adhere in the heating process to the bottom surface of the glass blank, and in then subjecting the glass blank to pneumatic pressure against a die to form the glass letter plate.

5. The process of making glass-letter-plates which consists in heating a glass blank together with a supporting plate, with fragments interposed at spaced intervals between the blank and the plate to space the glass blank above the supporting plate, the heat being applied until the glass blank becomes pliable and workable under pressure against a die, and the fragments being of material similar to the material of the glass letter plate.

6. The process of making glass-letter-plates which consists in heating a glass blank together with a perforated metal supporting plate, with glass fragments interposed at the corners of the blank between the blank and the plate to space the glass blank above the supporting plate, the heat being applied until the glass blank becomes pliable and workable under pressure against a die, and the glass fragments becoming adhered to the bottom surface of the glass blank, in the process of heating the blank and supporting plate.

7. The process of making glass-letter-plates, which consists in heating glass blanks together with perforated supporting plates, a glass plate resting on each supporting plate, in advancing them in succession through a furnace in which they are subjected to zones of heat of progressively increasing temperatures, in introducing metal plates without glass blanks at intervals in the succession of supporting plates with blanks passing through the furnace, the glass blank being gradually heated to a condition in which it is pliable and workable against a die, of then subjecting the glass blanks in succession to pneumatic pressure exerted upwardly through the supporting plates against a die which has been independently heated, of then dislodging each glass-letter-plate from its supporting plate to break any bond between them, and of then passing the supporting plates with glass letter plates thereon through an annealing oven, maintaining the proper degree of heat in the annealing oven by means of the metal plates which have been passed through the furnace and which are introduced into the annealing oven at intervals as required.

8. The process of making glass-letter-plates which consists in heating in successive order a plurality of supporting plates upon some of which are glass blanks, by advancing them through a furnace in which they are subjected to zones of heat of progressively increasing temperatures until the glass blanks are heated to a condition in which they are pliable and workable against a die, in then subjecting the glass blanks in succession to pneumatic pressure exerted upwardly through the perforated supporting plates, against a die, in then dislodging each glass blank from its supporting plate to break any bond that may have formed between them, of then passing the supporting plates with the glass letter plates thereon through an annealing oven, and in maintaining the proper temperature in the annealing oven by passing therethrough supporting plates without letter plates as required.

9. The process of making glass-letter-plates which consists in heating supporting plates, some of which have glass blanks thereon, by advancing them through a furnace in which they are subjected to zones of heat of progressively increasing temperature until the glass blank is heated to a condition in which it is pliable and workable against a die, of then subjecting the glass blanks to pneumatic pressure exerted upwardly through the supporting plates, against a die, which has been heated to a temperature approximating that of the glass plate, of dislodging each glass letter plate from its supporting plate to break any bond between them, of then subjecting the glass letter plates to the process of annealing by passing the same through an annealing oven from the hotter to the cooler end thereof, and in maintaining a proper temperature in the hotter end of the annealing oven by means of supporting plates which have been passed through the furnace without any glass blanks thereon.

In testimony that I claim the foregoing as my invention, I affix my signature in the presence of two witnesses, this 5th day of July, A. D. 1922.

ADOLPH W. GAST.

Witnesses:
NELLIE SULLIVAN,
T. H. ALFREDS.